United States Patent [19]

Prinz

[11] Patent Number: 5,113,960
[45] Date of Patent: May 19, 1992

[54] LIFT TRUCK WITH A DRIVE UNIT PRE-TENSIONED BY SPRING LOADING IN THE VERTICAL DIRECTION

[76] Inventor: Eugen Prinz, Heilbronner Str. 63, 7410 Reutlingen, Fed. Rep. of Germany

[21] Appl. No.: 481,507

[22] Filed: Feb. 16, 1990

[30] Foreign Application Priority Data

Feb. 17, 1989 [DE] Fed. Rep. of Germany ....... 3904798

[51] Int. Cl.⁵ .......................... B60K 1/00; B62D 21/18
[52] U.S. Cl. .................................. 180/65.5; 180/65.6; 280/43.12; 254/2 R
[58] Field of Search ............... 280/43.12, 43.17, 43.18, 280/43.23; 180/65.5, 65.6, 24.02, 209; 254/2 R, 93 L

[56] References Cited

U.S. PATENT DOCUMENTS

| | | | |
|---|---|---|---|
| 2,358,957 | 9/1944 | Barrett | 280/43.12 X |
| 2,417,394 | 3/1947 | Framhein | 280/43.12 X |
| 2,550,548 | 4/1951 | Framhein | 280/43.12 X |
| 3,625,534 | 12/1971 | Harrison et al. | 280/43.12 |
| 4,750,579 | 6/1988 | Jarl et al. | 280/43.12 X |

FOREIGN PATENT DOCUMENTS

| | | | |
|---|---|---|---|
| 142929 | 9/1948 | Australia | 280/43.12 |
| 0209502 | 1/1987 | European Pat. Off. | |
| 0329946 | 8/1989 | European Pat. Off. | |
| 1107384 | 5/1961 | Fed. Rep. of Germany | 254/2 R |
| 0150830 | 1/1985 | Fed. Rep. of Germany | |
| 3106027 | 11/1985 | Fed. Rep. of Germany | |
| 3614986 | 11/1987 | Fed. Rep. of Germany | |

Primary Examiner—Robert P. Olszewski
Assistant Examiner—Brian L. Johnson
Attorney, Agent, or Firm—McGlew & Tuttle

[57] ABSTRACT

In a lift truck, preferably a shaft-steered traveling lift truck with a drive unit (3) pre-tensioned by spring loading in the vertical direction, the drive unit is hinged, adjustably in height, by linkage parallelogram suspension (41, 42, 44) on a chassis part (1) of the lift truck which cannot be raised. To continuously adjust the drive wheel pressure to the useful load conditions, at least one lifting cylinder (45) of the working hydraulic system for the low lift (basic lift is arranged directly between a chassis part (49) that can be raised and the linkage parallelogram suspension (41, 42, 44), and its lower end is mounted in a horizontal transverse linkage (42). The support force of the lifting cylinder (45), which opposes the lifting force, is broken down according to a leverage ratio of lever (47) to lever (48) one force component is absorbed by the chassis part (1) that cannot be raised, and the other force component is transmitted directly to a drive wheel 5 of the drive unit 3 via a lever arm (47) in order to thus maintain the necessary driving and braking torque. In order for the drive unit (3) to be able to compensate for unevennesses of the ground even when the lift truck has been lowered, a lifting piston (50) of the lifting cylinder (45) has a free running segment (52) designed as residual stroke.

9 Claims, 3 Drawing Sheets

LIFT TRUCK WITH A DRIVE UNIT PRE-TENSIONED BY SPRING LOADING IN THE VERTICAL DIRECTION

FIELD AND BACKGROUND OF THE INVENTION

The present invention pertains to a lift truck. preferably a shaft-steered traveling lift truck, comprising a drive unit pre-tensioned by spring loading in the vertical direction, which drive unit is hinged, adjustably in height. by means of a linkage parallelogram suspension on a chassis part of the lift truck which cannot be raised, and whose ground contact pressure can be varied depending on the loading force, and a lifting cylinder for the low lift (basic lift) of chassis parts that can be raised.

West German Patent No. DE-PS 31,06,027 discloses a lift truck with a wheel hub drive, whose height can be adjusted and in which the pre-tensioning of at least one spring of a spring-mounted wheel hub drive is reduced in order to reduce the tilting moment when the lifting height and/or the loading increase, as a result of which the ground contact pressure is highest and steering is consequently most difficult in the nonloaded state. Because the tendency of the vehicle to tilt is to be primarily counteracted with this device, its use is limited mainly to high-lift trucks. There is usually no risk of tilting in the case of low-lift trucks, but optimization of the driving, steering, and braking forces is desirable, instead. The optimal braking force, in particular, might be questionable because of the continuous decrease in the ground contact with increasing load. Aside from this, this device is more susceptible to trouble and requires a large amount of maintenance because of the use of complicated hydraulic means, and its application is limited to lift trucks of the design equipped with wheel hub drives.

In another shaft-steered material handling device disclosed in EP- A0,150,830, a drive wheel arranged between two lateral support wheels is pressed against the ground to ensure ground contact by spring pressure means that can be pre-tensioned: the basic setting of the drive wheel pressure should be as low as possible, and it is increased via a sophisticated pre-tensioning device with a plurality of electrohydraulic setting elements as a function of a defined operating parameter, preferably a braking initiation signal. The inclination of the surface, the moment of load of the drive motor, the nature of the ground, or an arbitrary signal that can be generated manually can instead be used as alternative operating parameters. This device has the disadvantage that the constantly changing load states of the material handling device are not taken sufficiently into account. Even though the shaft almost always remains readily movable by the operator, the acceptability of making the stopping distance that must be maintained under any circumstances dependent upon the function of a plurality of electrohydraulic setting elements, e.g., switches, valves, hydraulic storage containers, and hydraulic cylinders, is highly questionable for safety reasons, because the drive wheel pressure on the surface, which pressure is needed to maintain the stopping distance, is abolished in the case of failure of one of the setting elements, and the drive wheel may slip due to a so-called sliding friction, as a result of which there is a risk that the stopping distance will increase in an unacceptable manner.

According to a device for increasing the braking force in industrial material handling trucks, which is described in EP-A0,209,502, the significance of the dependence of the braking process on the differences in the load states of the material handling truck has been recognized. Based on this, the increase in the load of the material handling truck is taken into account there in a meaningful manner when increasing the drive wheel pressure by increasing the pre-tensioning of a spring of an elastically suspended adjusting device in a load-dependent manner in order to thus increase the drive wheel pressure. The design and the function of this device appear to be relatively complicated, which is also associated with limited reliability in operation as a consequence of the fact that the susceptibility to trouble due to malfunction or failure of a hydraulic setting member cannot be ruled out, besides the considerable production costs.

SUMMARY AND OBJECTS OF THE INVENTION

It is an object of the present invention to provide, for a lift truck of the type mentioned above, at minimal cost, a device that functions simply and is therefore reliable in operation, with which the necessary steering force for the steering shaft connected to the drive can be minimized during the traveling operation. on one hand, and the braking and driving force needed for the actual load state can be ensured by continuously adjusting the drive wheel pressure to the load conditions. The task thus stated is accomplished according to the present invention by arranging the lifting cylinder directly between the lift truck chassis part that can be raised and the linkage parallelogram suspension. supporting it in the opposite direction, utilizing its lifting force. The purely mechanical utilization of the forces generated by the driving hydraulic system, which is inherently present in any lift truck, to maintain the ground contact pressure required for transmitting both the driving torque and the braking torque. undoubtedly represents a particularly inexpensive solution. which is characterized not only by a high level of reliability of operation, but especially by the reduced amount of maintenance required.

According to an advantageous embodiment of the present invention, to support the lifting cylinder in the direction of lift, the chassis part that can be raised is designed as a support and guide plate attached to the load chassis for a lifting piston of the lifting cylinder, as a result of which lifting cylinder is optimally supported and guided.

In a particularly meaningful geometric arrangement of the components, the lifting cylinder is mounted rotatably in the linkage parallelogram suspension with a certain leverage for support in the direction of lowering, and at least part of its supporting force can be transmitted to the drive unit via one of two lever arms formed by the point of support, which eliminates the need to use electrical or hydraulic auxiliary elements.

To take different useful load conditions into account, the supporting force of the lifting cylinder is designed to be load-dependent in order to increase the ground contact pressure of a drive wheel of the drive unit.

In a further development of the object of the present invention, the lifting cylinder has a free running segment which makes it possible to deflect the drive unit vertically downward when the lift truck has been lowered. The free running segment is designed as a residual stroke between the upper side of the support and guide plate and the upper end of the lifting piston of the lifting cylinder, which makes it possible to travel on uneven surfaces with depressions in the ground without eliminating the ground contact pressure between the drive wheel and the surface.

According to a preferred further development of the present invention, the lifting cylinder can be displaced and locked manually and/or automatically by extra adjustment means in the longitudinal direction of the lift truck to preselect the change in the leverage on the transverse linkage of the parallelogram suspension, as a result of which the operator can take changed operating states and different surfaces into account by making superimposed and preselectable adjustments on the lift truck.

For the basic setting of the drive wheel pressure needed for the unloaded lift truck, at least one compression spring is arranged between the chassis part that cannot be raised and a component attached rigidly to the drive for the spring-loaded pre-tensioning of the drive unit. The pre-tensioning of the compression spring is adjustable as desired, advantageously with a tensioning nut, in order to take the type, the design and the inherent weight of the lift truck sufficiently into account.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

DESCRIPTION OF THE PREFERRED EMBODIMENTS

Figure 1:
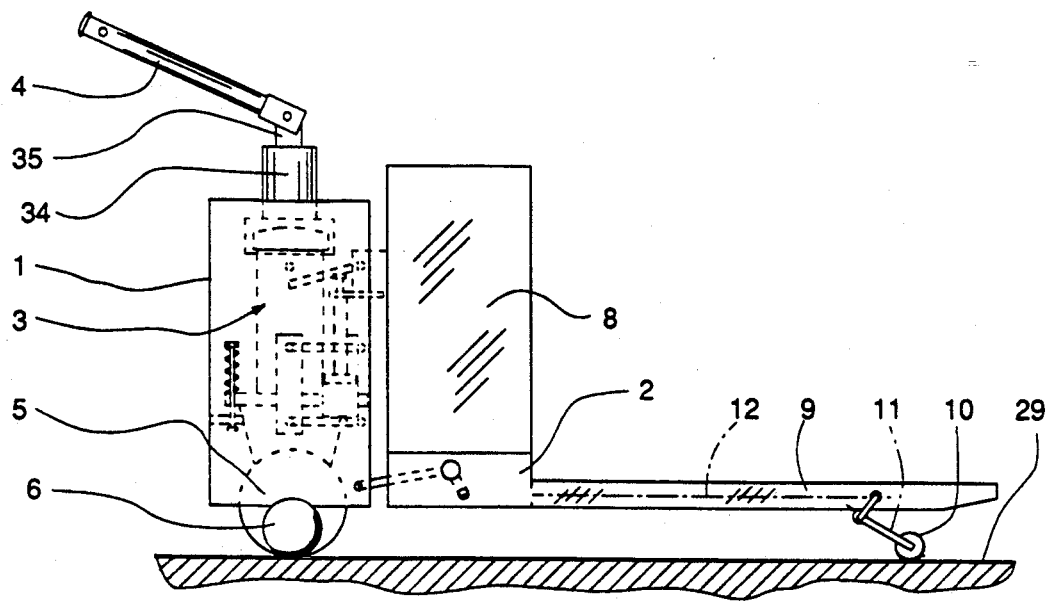
FIG. 1 shows a side view of a low-lift truck in the raised position with schematic representation of the drive.
Figure 2:
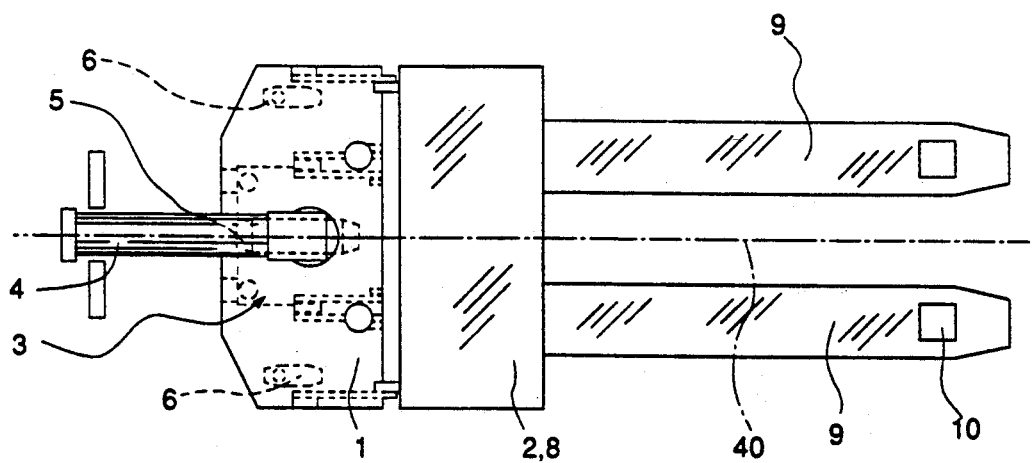
FIG. 2 shows a top view of the low-lift truck according to FIG. 1.

FIG. 1 and 2 show a design of a low-lift truck in the raised position according to the prior-art basic concept of the vehicle design. It consists essentially of a chassis part that cannot be raised in the form of a drive chassis 1 and a chassis part in the form of a load chassis 2, which is arranged behind the drive chassis and is hinged thereto. The drive chassis 1 contains a drive unit 3 and is equipped at its upwardly extending end with a steering shaft 4. A drive wheel 5 arranged centrally on the lower side of the drive chassis can be steered and braked in the known manner, which is therefore not represented and described in greater detail, in addition to controlling various functions of the vehicle. The drive chassis 1 is also supported by two essentially fixed castors 6. These are mounted in a support bracket 7 that is fastened, preferably welded, to the drive chassis 1 on both sides of the drive wheel 5 at the greatest possible distance from one another, in order to counteract the lift truck's tendency to tilt.

The load chassis 2 carries, among other things, a power supply unit 8 and is equipped with load carrying means in the form of two load arms 9. It is supported by load rollers 10 which are mounted in swiveling wheel forks 11 at the end of the load arms 9. These wheel forks 11 can be swiveled from a lowered position into a raised position via a push/pull linkage 12 indicated schematically in dash-dotted lines, as a result of which the low lift (basic lift), which is present in both embodiments of the lift truck, is brought about. Depending on the design, it may also be advantageous to associate the power supply unit 8 with the drive chassis 1 that cannot be raised, and/or to use load-carrying means of a different design, e.g., one with a plurality of degrees of freedom.

Figure 5:
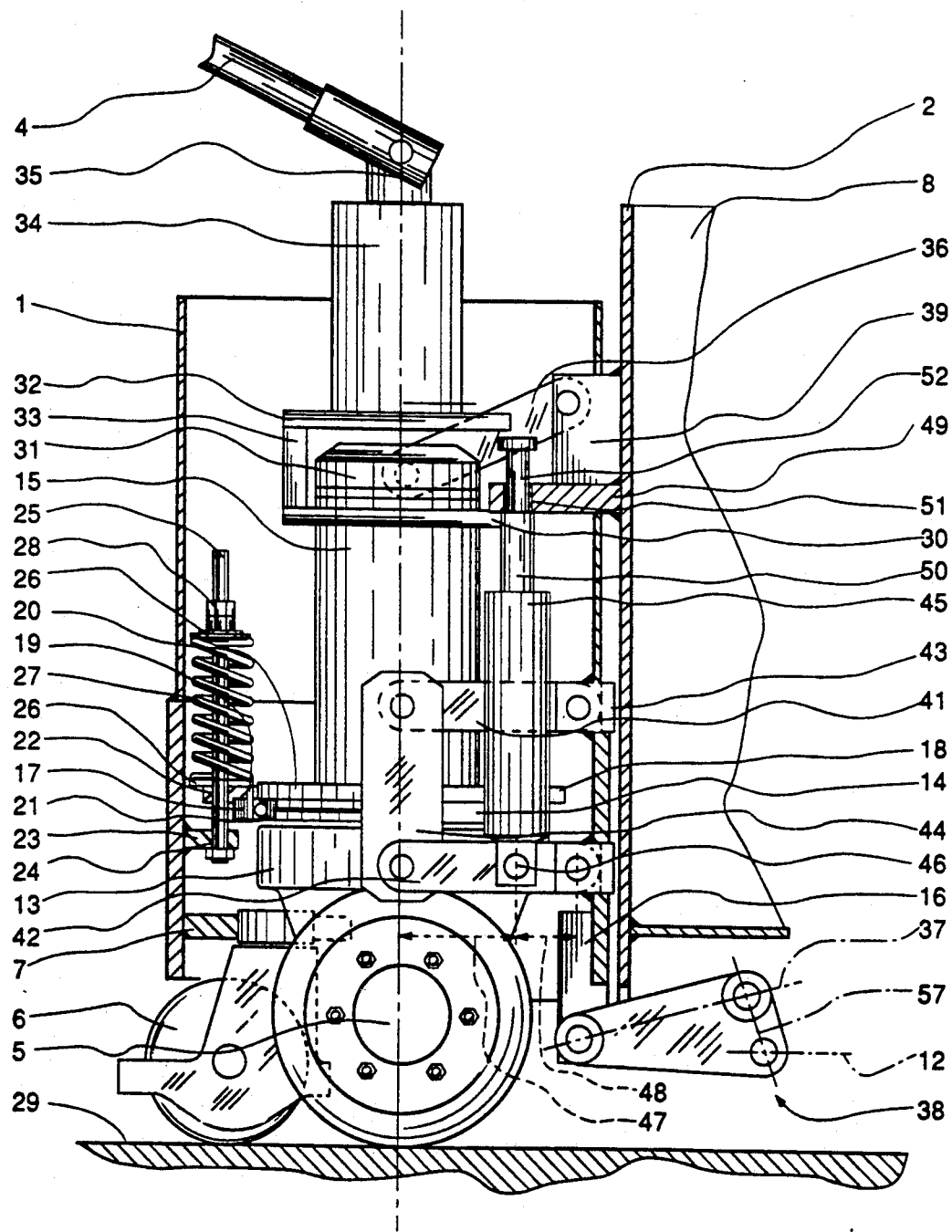

The drive unit 3 accommodated in the drive chassis 1 shows essentially the following structure, which is shown in FIG. 5, viewed from bottom to top.

The drive wheel 5 is fastened to a gearbox 13, which is coupled with a driving motor 15 via a rotating ring bearing 14. A gearbox plate 18 of rectangular cross section, with two smaller holes 22 in its area opposite the load chassis 2 next to a central bore 19, is arranged above the rotating ring bearing 14 and is rigidly connected to its outer ring 17. The driving motor 15 is flanged in the central hole 19 on the inner ring 21 of the rotating ring bearing 14 by means of a lower motor flange 20. In the preferred embodiment longitudinal lever 44 is welded at the gearbox plate 18 which is a stationary construction part. This gearbox plate 18 is made rectangular and contains the central bore 19. In this central bore 19, the lower motor flange 20 carrying the driving motor 15 is rotatably arranged. Therefore, the whole drive unit with its driving motor 15, its gearbox 13 and its drive wheel 5 is rotatable inside the gearbox plate 18, while the gearbox plate 18 is fixed permanently and ridgedly by means of the longitudinal lever 44 and the two transverse levers 41 and 42 to the mounting straps 43 of the drive chassis 1. Thus, the gearbox plate 18 is not fixed itself at the drive chassis 1 but only by means of the above-mentioned construction parts 41-44, and the drive wheel 5 and the gearbox 13 thus form a unit that can be rotated together.

Two clamping plates 23, designed as flat parts, are fastened on the drive chassis 1 under the gearbox plate 18. Aligned with the holes 22, holes 24 of equal diameter are provided in the clamping plates. A clamping bolt 25, which has threaded ends on both sides, extends through the holes 22 and 24; at least one spring pressure means 27, which is designed as a compression spring in the embodiment according to FIG. 5, is arranged on the clamping bolt above the gearbox plate 18 between two spring cups 26. Depending on the type of the vehicle and the design, it is also possible to use instead of springs, hydraulic, pneumatic or hydropneumatic spring pressure means 27.

At its two threaded ends, the clamping bolt 25 is secured with nuts 28, of which the one arranged above the upper spring cup 26 serves as an adjustable tightening nut. Using this nut, it is possible not only to preset the pre-tensioning of the compression spring as a function of the inherent weight of the lift truck, but also to adjust it at any time as desired. A motor brake 31 flanged onto the driving motor 15 by means of an upper motor flange 30 can be designed as an electrical solenoid brake or as a mechanical brake that can be actuated from the shaft 4.

A shaft flange 32, which is screwed to the upper motor flange 30 by means of spacer sleeves 33, is arranged above the motor brake 31. A shaft superstructure 34 with a shaft bearing 35 is supported on the housing thus formed.

Figure 3:
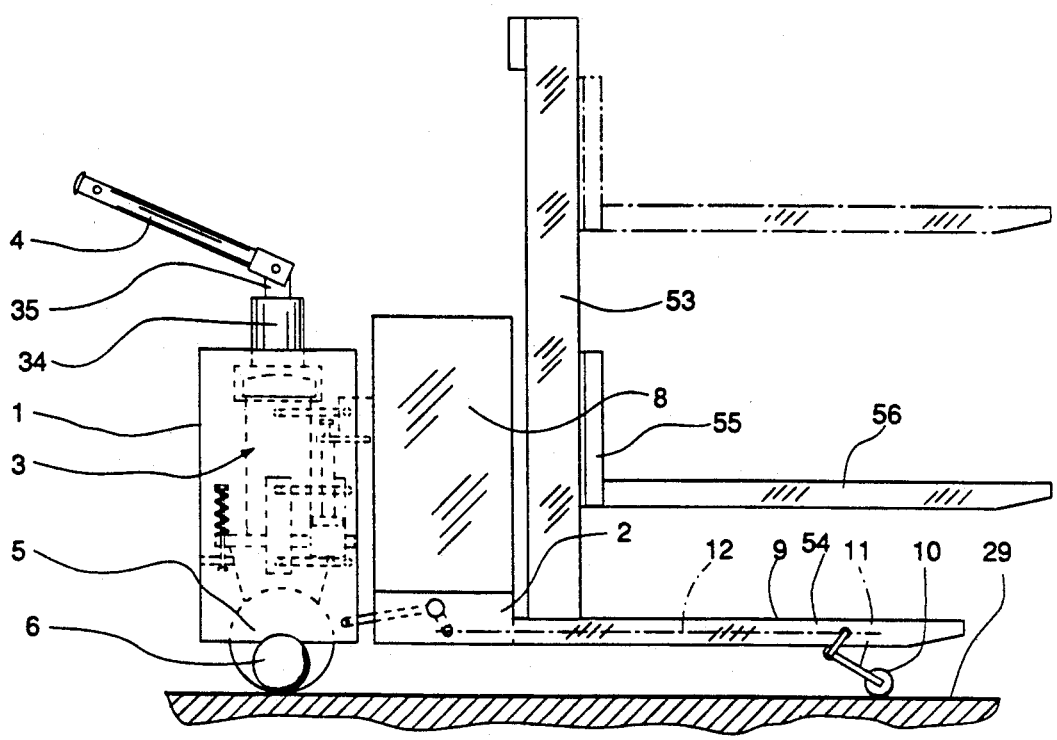
FIG. 3 shows a side view of a high-lift truck with increased basic lift and schematic representation of the drive.

The hinged connection between the drive chassis 1 and the load chassis 2 is established via a parallelogram 36, 37, 38 arranged on both sides of the drive unit 3, which is formed by two upper load linkages 36, on one hand, and two long lever legs 37 of lower load linkages 38, on the other hand. One end of each upper load linkage 36 is mounted in a housing projection 39 of the load chassis 2, while the other end is hinged laterally to the drive chassis 1. Each lower load linkage 38 is mounted in a fastening plate 16, which in turn is fixed in the lower zone of the side of the drive chassis 2 extending at right angles to the longitudinal axis 40 of the lift truck. The push/pull linkage 12 for the low lift (basic lift) of the lift truck, which is indicated schematically in FIGS. 1 and 3, is hinged to a short lever leg 57 of the lower load linkage 38.

The entire drive unit 3 is fastened adjustably in height on two sides to the drive chassis 1 by means of a parallelogram suspension (41, 42, 44). Each side of the suspension consists of a pair of drive unit linkages in the form of two transverse linkages 41 and 42, which are parallel to each other and one end of which is mounted in mounting straps 43 of the drive chassis 1. The other ends of the transverse linkages 41, 42 are hinged to a longitudinal member 44, which closes the parallelogram linkages and to which the gearbox plate 18 is fastened, preferably welded. Due to this hinged suspension, which is adjustable in height, the drive unit 3 is able to perform the vertical movements necessary for compensation for unevennesses of the ground without losing contact with the ground (FIG. 5)

As in all lifting vehicles, the lift truck also has at least one, or according to the embodiments shown in FIGS. 1-4 even two, lifting cylinders 45 for the low lift (basic lift) of the load chassis 2. Each lifting cylinder is arranged vertically and is rotatably mounted at its lower end to at least one of the two, preferably horizontally extending, transverse drive unit linkage 41 and 42, respectively. By selecting the position of the support point 46, on for example the lower transverse linkage 42 by a ratio adjustment means the lower transverse linkage is subdivided into two lever arms 47 and 48. The point of support 46 is preferably selected so that the lever arm 47 directed toward the longitudinal member 44 is longer than the lever arm 48 extending to the drive chassis 1.

The upper end of the lifting cylinder 45 is held in a support and guide plate 49, which is fastened and preferably welded to the drive chassis 1, and the lifting piston 50 of the lifting cylinder 45 extends through a bearing bore 51 of the support and guide plate 49. The lifting cylinder 45 is provided with a free running segment 52, so that a residual stroke is left between the top end of the lifting piston 50 and the top side of the support and guide plate 49 even in the lowered position of the lifting piston 50 (FIG. 5).

Figure 4:
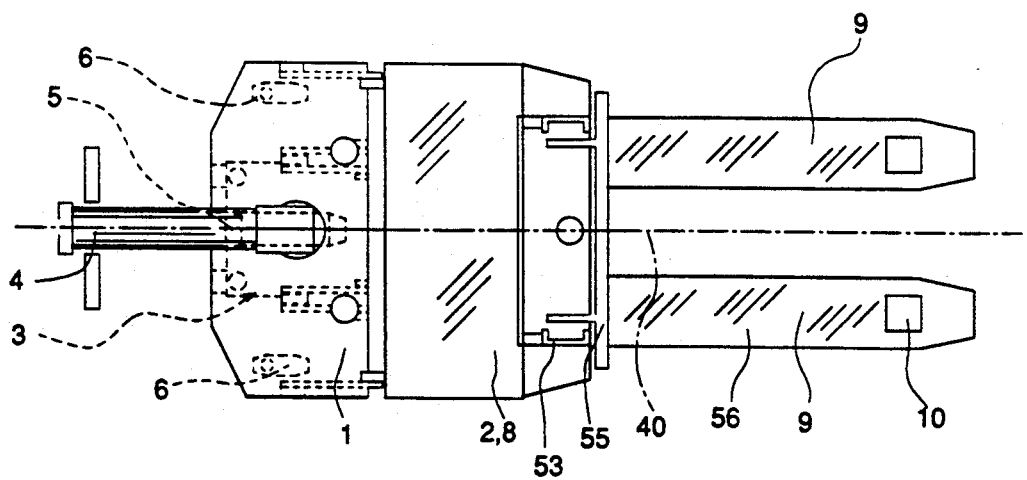
FIG. 4 shows a top view of the high-lift truck according to FIG. 3, and shows a detailed representation of the drive as a detail from FIGS. 1 and 3.

The design of the drive chassis 1 with the drive unit 3 of the high-lift truck shown in FIGS. 3 and 4 corresponds to that of the low-lift truck according to FIGS. 1 and 2, which was described before. However, the load chassis 2 is different because it additionally carries a lift mast 53, which is supported on a pair of wheel forks 54 and is provided with a vertically movable lifting carriage 55, on which the actual load-carrying means 56 are arranged. Even though the load-carrying means are designed as wheel forks in the example in a simplified manner, it is, of course, also possible to use load-carrying means of any other design, e.g., swiveling, pushing or swiveling and pushing forks.

The mode of operation of the drive according to the present invention will be described in greater detail below.

When the lifting truck is empty or unloaded, the second side, supported by the drive wheel and casters, is light and the ground contact pressure between the drive wheel 5 and the surface 29 necessary for the unloaded lifting truck is generated by the compression spring(s) 27. Because this ground contact pressure can vary as a function of the type and the inherent weight of the lift truck, the pre-tensioning force of the compression spring(s) can be preset as a function of these parameters with the tensioning nut 28. As the load on the load chassis 2 increases, the lifting cylinder 45 becomes supported with its lifting piston 50 on the lower side of the support and guide plate 49. The support force resulting from this, whose direction is opposite the lifting force, is introduced via the point of support 46 into the lower transverse linkage 42 of the linkage parallelogram suspension 41, 42, 44, and broken down into two force components there, corresponding to the leverage ratio of lever 47 to lever 48 existing there. While the larger of the force components thus produced is introduced via the short lever arm 48 into the drive chassis 1 and is absorbed by it, the smaller of the force components is transmitted directly to the drive unit 3 via the longer lever arm 47, as a result of which the ground contact pressure of the drive wheel 5 is increased. It was found to be useful to determine the built-in leverage ratio of the lever 47 to the lever 48 not only by calculation, but also empirically.

It is obvious that the support force of the lifting cylinder 45 and consequently also the additional force component transmitted to the drive wheel 5 increase with increasing useful load so much that the actual ground contact pressure between the drive wheel 5 and the surface 29, which is required for driving and braking, is always guaranteed. Because the slight rising and lowering of the load-carrying means 9 and 56 caused by the unevennesses of the ground are uniformly reduced by the built-in leverage of 47 to 48 of the lower transverse lever 42, it is of secondary importance and insignificant for the actual transportation of the load.

To make it possible to travel over depressions even with the lift truck in the lowered position without running the risk of completely eliminating the ground contact pressure between the drive wheel 5 and the surface 29, vertical deflection of the entire drive unit in the downward direction is necessary. This is achieved through spring 27 the built-in free running segment 52 at the upper support point of the lifting cylinder 45, according to which the residual lift, remaining as a reserve, equalizes these unevennesses of the surface.

Thus, the meaningful geometric arrangement according to the present invention of the essential components, which are inherently present in the lift truck, advantageously utilizing the support forces of the lifting cylinder 45, offers a particularly inexpensive solution to the basic task. This solution is characterized especially by its simplicity because of the elimination of any electrical, hydraulic, or electrohydraulic auxiliary element, as a result of which a device is obtained that is not only inexpensive but also extremely reliable in operation and relatively maintenance-free.

The present invention is not, of course, limited to the embodiments represented in the figures and described in the description. It is obvious that numerous design modifications are within the scope of the present invention. Thus, it is conceivable to adopt the drive suspension to lift trucks and material handling devices of different designs, e.g., to those in which the operator rides with the vehicle. It is also possible for the person skilled in the art to design the lifting cylinder 45 as a cylinder that can be displaced and locked in the longitudinal direction of the lift truck using known mechanical, electrical, hydraulic, or pneumatic means in order to thus change the leverage and consequently the ground contact pressure of the drive wheel 5 corresponding to the existing operating conditions in a preselectable manner, and, of course, the use of automatic control means also appears to be a possibility. This also applies to the basic setting of the pre-tension of the compression spring(s) 27.

While specific embodiments of the invention have been shown and described in detail to illustrate the application of the principals of the invention, it will be understood that the invention may be embodied otherwise without departing from such principals.

What is claimed is:

1. A shaft steered lift truck, comprising:
   a drive chassis;
   a drive unit connected with a drive wheel;
   drive unit linkage means pivotally connecting said drive unit to said drive chassis;
   a load chassis;
   load linkage means pivotally connecting said load chassis to said drive chassis; and
   a lifting cylinder having a first end connected to one of said drive unit linkage means and having a second end connected to said load chassis.

2. A shaft steered lifting truck, comprising:
   a drive unit rotatably supported by a driving wheel and means for rotating said driving wheel;
   a drive chassis rotatably supported by castors to support and stabilize the lifting truck;
   a gearbox plate rotatably holding said drive unit;
   a longitudinal member attached to said gearbox plate;
   an upper drive unit linkage substantially horizontal and hingedly connected to said longitudinal member on a first end and hingedly connected to said drive chassis on an opposite second end;
   a lower drive unit linkage substantially parallel to said upper drive unit linkage and hingedly connected to said longitudinal member on a first end and hingedly connected to said drive chassis on an opposite second end;
   a load chassis being configured to support a load placed upon it, said load chassis having a first and second side;
   a lifting cylinder having a first end rotatably connected to said lower drive unit linkage and having a second end connected to said load chassis, ratio adjustment means for adjusting said connection of said first end of said lifting cylinder between said first and second ends of said lower drive unit linkage, a free-running segment on said second end of said lifting cylinder allowing said drive wheel to move in order to compensate for uneven terrain;
   a triangular shaped lever leg having three corners, said lever leg being rotatably connected at a first corner to said drive chassis, and being rotatably connected at a second corner to said load chassis;
   a push/pull linkage rotatably connected to a third corner of said lever leg and said push-pull linkage extending substantially horizontally under said load chassis;
   a triangularly shaped wheel fork having three corners, said wheel fork being rotatably connected at a first corner to said push/pull linkage, and being rotatably connected at a second corner to said load chassis;
   a load roller rotatably connected to a third corner of said wheel fork;
   said lifting cylinder, raising said first side of said load chassis and moving said lever leg, said push/pull linkage, said wheel fork and said load rollers to raise said second side of said load chassis;
   at least one spring means connected vertically between said drive unit and said drive chassis, for applying ground contact pressure to said driving wheel;
   a spring adjustment means for adjusting said spring means to vary said ground contact pressure applied by said spring means; and
   load carrying means dividing support for said power supply unit between said drive unit and said drive chassis.

3. A shaft steered lifting truck, comprising:
   a drive unit rotatably supported by a driving wheel and means for rotating said driving wheel;
   a drive chassis rotatably supported by castors to support and stabilize the lifting truck;
   a gearbox plate rotatably holding said drive unit;
   a drive unit linkage hingedly connected to said drive unit on a first end and hingedly connected to said drive chassis on an opposite second end;
   a load chassis;
   a lifting cylinder having a first end rotatably connected to said drive unit linkage and having a second end connected to said load chassis;
   a triangularly shaped lever leg having three corners, said lever leg being rotatably connected at a first corner to said drive chassis, and being rotatably connected a second corner to said load chassis;
   a push/pull linkage rotatably connected to a third corner of said lever leg, said push/pull linkage extending substantially horizontally under said load chassis;
   a triangularly shaped wheel fork having three corners, said wheel fork being rotatably connected at a first corner to said push/pull linkage, and being rotatably connected to a second corner to said load chassis;
   a load roller rotatably connected to a third corner of said wheel fork; and
   said lifting cylinder, raising said first side of said load chassis and moving said lever leg, said push/pull linkage, said wheel fork and said load rollers to raise said second side of said load chassis.

4. A lifting truck comprising:
   a drive unit rotatably supported by a driving wheel and means for rotating said driving wheel;
   a drive chassis rotatably supported by castors to support and stabilize the lifting truck;
   drive unit linkage means connecting said drive unit to said drive chassis;
   a load chassis configured to support a load placed thereupon;
   load linkage means connecting said load chassis to said drive chassis;

a lifting cylinder having a first end connected to one of said drive unit linkage means and having a second end connected to said load chassis;

said load chassis rotatably supported by load rollers which support a first side of the lifting truck and said load;

said drive wheel and castors configured to support a second side, opposite said first side, of the lifting truck and said load;

said load rollers are connected to a first end or push-/pull linkages;

a second end of said push/pull linkages is connected to a lower linkage of said load linkage means;

said push/pull linkages are configured so that when said lifting cylinder raises said load chassis, said load rollers also lift said load chassis;

said first end of said lifting cylinder is rotatably attached to a position between ends of said drive unit linkage means, so that support of said second side is divided between said drive unit and said drive chassis.

5. A lifting truck in accordance with claim 4, further comprising:

at least one spring means connected vertically between said drive unit and said drive chassis, for applying ground contact pressure to said driving wheel.

6. A lifting truck in accordance with claim 5, further comprising:

spring adjustment means for adjusting said spring means to vary said ground contact pressure applied by said spring means.

7. A lifting truck in accordance with claim 4, further comprising:

ratio adjustment means for adjusting said position of said first end of said lifting cylinder between said ends of said drive unit linkage.

8. A lifting truck in accordance with claim 5, further comprising:

a free-running segment on said second end of said lifting cylinder allowing said drive wheel to move in order to compensate of the uneven terrain.

9. A lifting truck in accordance with claim 4, further comprising:

a load carrying means for dividing support of a power supply unit between said drive unit and said drive chassis.

* * * * *